United States Patent
Odate et al.

(10) Patent No.: US 8,109,460 B2
(45) Date of Patent: Feb. 7, 2012

(54) SEATBELT APPARATUS OF VEHICLE

(75) Inventors: Shotaro Odate, Utsunomiya (JP); Yoshitaka Suzuki, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 475 days.

(21) Appl. No.: 11/937,662

(22) Filed: Nov. 9, 2007

(65) Prior Publication Data

US 2008/0173748 A1 Jul. 24, 2008

(30) Foreign Application Priority Data

Nov. 10, 2006 (JP) .................................. 2006-305187

(51) Int. Cl.
B60R 22/34 (2006.01)

(52) U.S. Cl. ....................... 242/374; 242/390.9; 701/45

(58) Field of Classification Search .................. 242/374, 242/390.8, 390.9; 280/806, 807; 297/475–478; 701/36, 45–47

See application file for complete search history.

(56) References Cited

U.S. PATENT DOCUMENTS

| | | | |
|---|---|---|---|
| 2002/0166916 A1 | 11/2002 | Fujii et al. | |
| 2002/0189880 A1 | 12/2002 | Tanaka et al. | |
| 2004/0056471 A1* | 3/2004 | Bullinger et al. | 280/806 |
| 2005/0077717 A1* | 4/2005 | Midorikawa | 280/806 |
| 2005/0083000 A1* | 4/2005 | Specht et al. | 318/432 |
| 2005/0253012 A1* | 11/2005 | Tanaka et al. | 242/390.9 |
| 2006/0065771 A1* | 3/2006 | Takao et al. | 242/374 |
| 2006/0097096 A1* | 5/2006 | Heckmayr | 242/374 |
| 2006/0145463 A1* | 7/2006 | Isaji et al. | 280/806 |

FOREIGN PATENT DOCUMENTS

| | | |
|---|---|---|
| EP | 1 293 401 | 3/2003 |
| EP | 1 518 766 | 3/2005 |
| EP | 1 640 225 | 3/2006 |
| JP | 2003-081056 | 3/2003 |

* cited by examiner

*Primary Examiner* — Michael Mansen
*Assistant Examiner* — Scott Haugland
(74) *Attorney, Agent, or Firm* — Rankin, Hill & Clark LLP

(57) ABSTRACT

This seatbelt apparatus of a vehicle is provided with: a seatbelt; a belt reel on which the seatbelt is wound; a motor that drives a rotation of the belt reel; a controller that controls a driving amount of the motor; a winding position detection device that detects a winding position of the belt reel. The controller performs a first control mode in which a substantially constant electricity is supplied to the motor, and a second control mode in which the electricity supplied to the motor is controlled based on a predetermined rule; and sets an initial value for the second control mode based on changes in the winding position detected by the winding position detection device, while changing from the first control mode to the second control mode.

7 Claims, 10 Drawing Sheets

SEATBELT APPARATUS OF VEHICLE

BACKGROUND OF THE INVENTION

Priority is claimed on Japanese Patent Application No. 2006-305187, filed Nov. 10, 2006, the contents of which are incorporated herein by reference.

FIELD OF THE INVENTION

The present invention relates to a seatbelt apparatus of a vehicle.

DESCRIPTION OF THE RELATED ART

In a seatbelt apparatus of a vehicle that restricts an occupant sitting in a seat of a vehicle, driving force for winding a seatbelt while releasing it is normally generated by a spring. Recently, a seatbelt apparatus of a vehicle is developed which utilizes a driving force of a motor to assist the winding of a seatbelt.

For example, Japanese Unexamined Patent Application, First Publication No. 2003-81056 discloses a seatbelt apparatus that increases a winding power by activating a motor when winding power by a spring falls equal to or less than the predetermined value.

In this conventional seatbelt apparatus, while winding the seatbelt if the seatbelt or a tongue is hooked on a cloth or the like of an occupant and the winding force by the spring thereby falls equal to or less than the predetermined value, the motor is activated to increase the winding force. However, there is a case in which ON/OFF operations of the motor is repeated since the motor is stopped upon recovering the winding force by activating the motor. In such a case, since the winding operation of the seatbelt becomes discontinuous, and thereby the occupant may feel uncomfortableness thereby.

In view of the above-mentioned circumstances, the present invention has an object of providing a seatbelt apparatus of a vehicle that can improve the continuity of winding a seatbelt by stabilizing the winding speed while switching electricity to be supplied to a motor, and thereby enabling operation of the motor without causing uncomfortableness to an occupant.

SUMMARY OF THE INVENTION

The present invention employed the followings in order to achieve the above-mentioned object.
(1) The present invention employs a seatbelt apparatus of a vehicle provided with: a seatbelt; a belt reel on which the seatbelt is wound; a motor that drives a rotation of the belt reel; a controller that controls a driving amount of the motor; a winding position detection device that detects a winding position of the belt reel, wherein the controller performs a first control mode in which a substantially constant electricity is supplied to the motor, and a second control mode in which the electricity supplied to the motor is controlled based on a predetermined rule; and sets an initial value for the second control mode based on changes in the winding position detected by the winding position detection device, while changing from the first control mode to the second control mode.

According to the seatbelt apparatus of a vehicle, the amount of the electricity to be supplied to the motor is substantially constant in the first control mode; therefore, it is possible to prevent applying excessive tension to the seatbelt when the seatbelt or the like is hooked on the occupant.

In addition, when the control by the controller is shifted from the first control mode to the second control mode, an initial value for a control target in the second control mode is set based on the amount of change in the winding position; therefore, it is possible to maintain the continuity while shifting from the first control mode to the second control mode.

Accordingly, it is possible to prevent applying the excessive tension to the seatbelt in the first control mode and thereby preventing causing uncomfortableness to the occupant. Furthermore, the continuity can be maintained while shifting from the first control mode to the second control mode, and thereby preventing causing uncomfortableness to the occupant.

(2) The seatbelt apparatus of a vehicle may be further provided with: a tongue through which the seatbelt is inserted; a buckle which detachably engages with the tongue to set the seatbelt in a fitted state; and a buckle state detection device that detects an engagement/detachment state of the buckle to the tongue, wherein the controller performs the first control mode when the buckle state detection device detects a detachment of the tongue to the buckle, and performs the second control mode when the winding position detection device detects that the seatbelt is wound for a first predetermined amount after the detachment of the tongue to the buckle is detected.

In this case, it is possible to automatically start controlling the motor in the first control mode when the tongue is released from the buckle. In addition, it is possible to automatically start controlling the motor in the second control mode when the seatbelt is wound for the first predetermined amount.

(3) The controller may perform the second control mode so as to maintain, for a predetermined time, a winding speed at the time when the seatbelt is wound for the first predetermined amount.

In this case, the seatbelt can be smoothly wound so as to maintain the constant winding speed, for the predetermined time.

(4) The controller may perform the second control mode so as to maintain a winding speed at the time when the seatbelt is wound for the first predetermined amount, at an interval from the time when the seatbelt is wound for the first predetermined amount to the time when the seatbelt is further wound for a second predetermined amount.

In this case, the seatbelt can be smoothly wound so as to maintain the constant winding speed until the seatbelt is wound for the second predetermined amount.

(5) The controller may perform the second control mode so as to continuously decrease a winding speed from a winding speed at the time when the seatbelt is wound for the first predetermined amount, in an interval from the time when the seatbelt is wound for the second predetermined amount to the time when the seatbelt is completely wound.

In this case, it is possible to prevent the tongue roughly contacting an interior decoration of the vehicle when the seatbelt is almost completely wound.

(6) The controller may perform the second control mode so as to continuously decrease a winding speed from a winding speed at the time when the seatbelt is wound for the first predetermined amount.

In this case, it is possible to stably and smoothly wind the seatbelt, and to prevent the tongue roughly contacting an interior decoration of the vehicle when the seatbelt is almost completely wound.

DETAILED DESCRIPTION OF THE INVENTION

Embodiments of a seatbelt apparatus of a vehicle according to the present invention (hereinafter "seatbelt apparatus") will be explained below with reference to the drawings.

First Embodiment

Firstly, a first embodiment of the present invention will be explained below with reference to FIGS. 1 to 6C.

Figure 1:
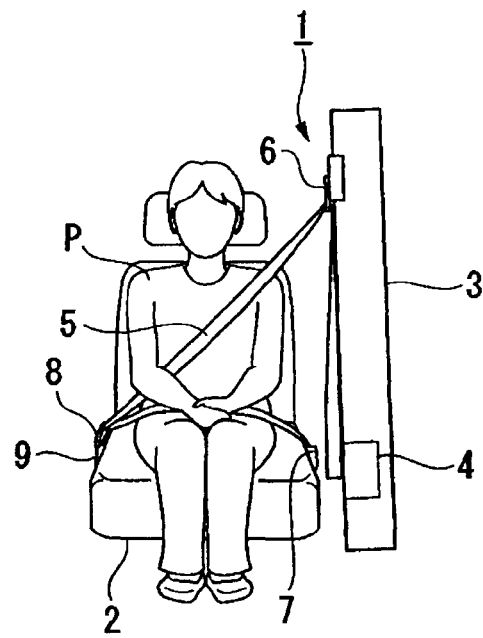
FIG. 1 is a front view of a seatbelt apparatus of a vehicle according to a first embodiment of the present invention.

FIG. 1 is a general construction of a seatbelt apparatus 1 that, in the present embodiment, restricts an occupant P sitting in a seat 2 of a driver's seat. This seatbelt apparatus 1 is a so-called three-point seatbelt apparatus in which: a seatbelt 5 is drawn upward from a retractor 4 installed in a center pillar 3; the seatbelt 5 is inserted through a through anchor 6 supported on an upper side of the center pillar 3; and a distal end of the seatbelt 5 is fixed, via an outer anchor 7 arranged on the vehicular outside of the seat 2, to a floor of a vehicle. A tongue 8 is attached between the through anchor 6 of the seatbelt 5 and the outer anchor 7. The tongue 8 is attachable and detachable to a buckle 9 fixed to the floor on a driver's seat 2 side of the vehicle.

In this seatbelt apparatus 1, the occupant P sitting on the seat 2 can set it to a fitted state by inserting the tongue 8 into the buckle 9 to engage therewith. In addition, the occupant P can also set the seatbelt apparatus 1 in a released state by releasing the engagement between the tongue 8 with the buckle 9 and separating the tongue 8 from the buckle 9 (hereinafter, this is sometimes referred to as "releasing the buckle 9").

Figure 3:
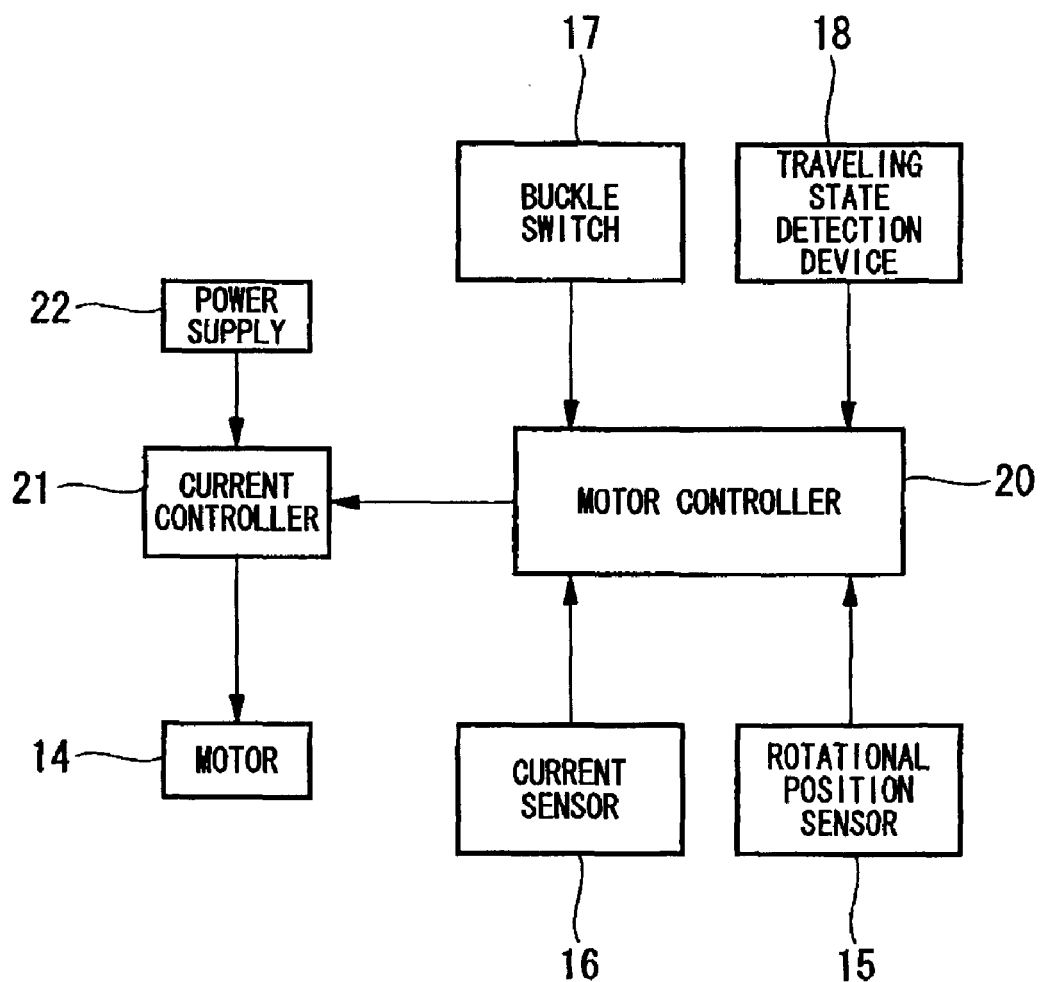
FIG. 3 is a block diagram of a motor for driving a belt reel in the seatbelt apparatus.

A shown in FIG. 3, the buckle 9 is provided with a buckle switch 17. The buckle switch 17 is turned ON when the tongue 8 is engaged with the buckle 9 (in other words, in a state where the seatbelt 5 is attached), while the buckle switch 17 is turned OFF when the tongue 8 is released from the buckle 9 (in other words, in a state where the seatbelt 5 is unattached).

Figure 2:
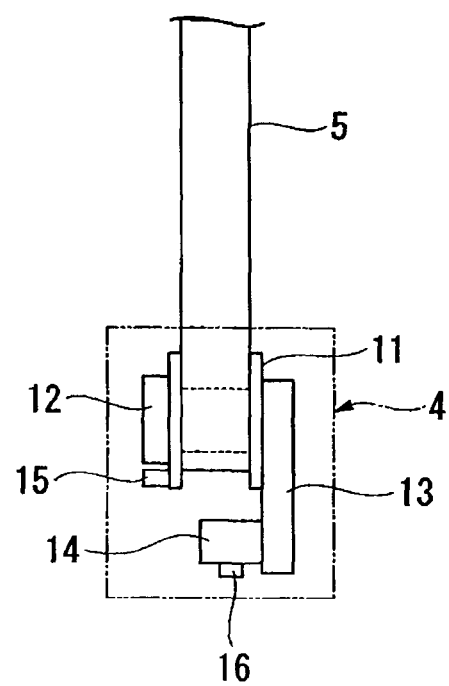
FIG. 2 is a general view of a retractor of the seatbelt apparatus.

As shown in FIG. 2, the retractor 4 is mainly provided with: a rotatable belt reel 11 on which the seatbelt 5 is wound; a spring 12 that urges the belt reel 11 so as to rotate in the winding rotational direction thereof; and a motor 14 that applies a rotational power in the winding rotational direction to the belt reel 11 via a transferring device 13 such as gears. Furthermore, the retractor 4 is provided with: a rotational position sensor (winding position detection device) 15 that detects a rotational position (winding position) of the belt reel 11; and a current sensor 16 that measures the current to be supplied to the motor 14.

Moreover, the winding amount of the belt reel 11 is substantially equal to the winding amount of the seatbelt 5.

In this retractor 4 having an above-mentioned construction, the belt reel 11 is rotated in the winding direction by the spring 12, and also could be rotated in the same winding direction by the driving force of the motor 14. In addition, winding of the belt reel 11 after releasing the buckle 9 is performed by the recovering force of the spring 12, and the rotational force of the motor 14 that is transferred through the transferring device 13.

When the belt reel 11 is rotated to draw the seatbelt 5, the power transfer between the belt reel 11 and the motor 14 is terminated so as not to cause friction by the motor 14 while drawing the seatbelt 5.

As shown in a control block diagram of FIG. 3, the motor 14 is controlled by the motor controller 20, and is driven to wind the belt reel 11 after releasing the buckle 9. In addition, the motor 14 is also driven to apply the predetermined tension to the seatbelt 5, to support the occupant P at the predetermined position, and to remove the looseness in the seatbelt 5 occurred while traveling, when the predetermined traveling state is detected by a traveling state detection device 18 (for example, when the case is detected in which the output of a sensor that measures the quantity relating to motions of the vehicle such as the acceleration in the car width direction exceeds the predetermined threshold value, or when the case is detected in which changes in the traveling circumstances are detected based on communication information from a navigation system or the like).

The motor controller (controller) 20 is input with output signals from the rotational position sensor 15, the current sensor 16, and the buckle switch 17. Furthermore, the motor controller 20 is input with an alarming trigger when the traveling state detection device 18 detects the above-mentioned predetermined traveling state. The motor controller 20 sets the activation timing and the stop timing, and the target current based on the input signals, and then outputs to a current controller 21. The current controller 21 adjusts the activation timing and the stop timing of the motor 14, and the current to be supplied to the motor 14, based on the input from the motor controller 20, and thereby supplies electrical power from the power supply 22 to the motor 14.

Next, the current control of the motor 14 for winding the belt reel 11 after releasing the buckle 9 (that is a feature of the present invention) will be explained below referring to the flowchart of FIG. 4.

Figure 4:
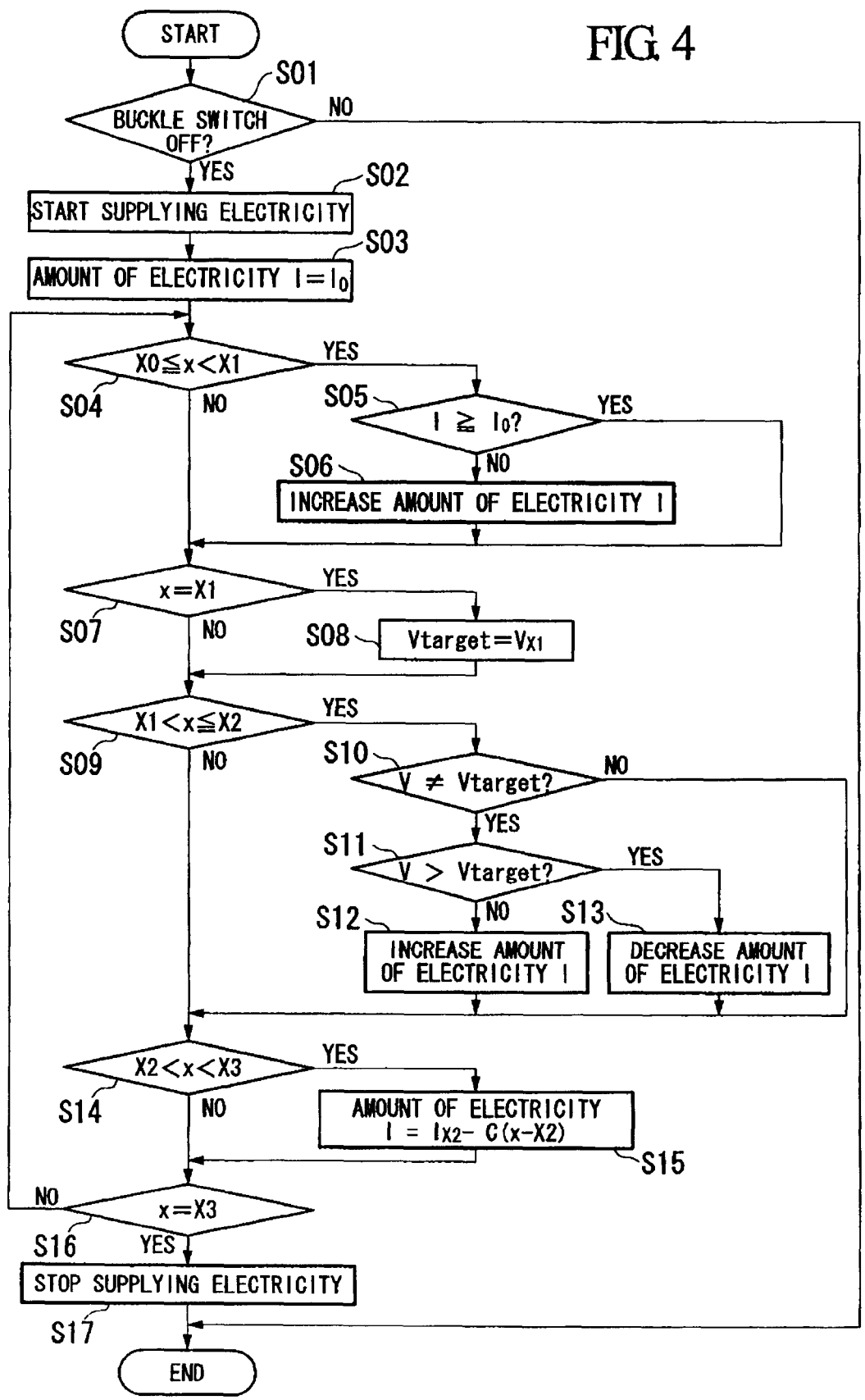
FIG. 4 is a flowchart for controlling current to be supplied to the motor for driving the belt reel in the seatbelt apparatus.

The control routine for controlling the current to be supplied to the motor 14 shown in flowchart of FIG. 4, is repeated by the motor controller 20 at constant time intervals.

Firstly, in step S01, it is determined whether the buckle switch 17 is in OFF or not.

If the determination result in step S01 is NO (i.e., ON), then this routine is temporarily ended.

On the other hand, if the determination result in step S01 is YES (i.e., OFF), then the process proceeds to step S02, and supplying the electricity to the motor 14 is started. Then, the process further proceeds to step S03, and the electricity (the current) I to the motor 14 is set to an initial current $I_0$ that was set in advance.

Next, the process proceeds to step S04, and it is determined whether the current winding position x of the belt reel 11 detected by the rotational position sensor 15 is equal to or larger than the winding position X0 of the belt reel 11 at the time releasing the buckle 9 (hereinafter "winding position at the releasing") or not; and whether the current winding position x of the belt reel 11 is smaller than the winding position X1 (X1=X0+a. Hereinafter "first winding position") that is the position where the seatbelt 5 is wound for the predetermined amount set in advance (first predetermined amount) from the winding position at the releasing X0 or not. The predetermined amount "a" is comparatively set to be a short length such as 50 mm.

If the determination result in step S04 is YES (X0≦x≦X1), then the process proceeds to step S05. Then, it is determined whether the current I to be supplied to the motor 14, that is measured by the current sensor 16 is equal to or larger than an initial current value $I_0$ or not.

If the determination result in step S05 is NO (I<$I_0$), then the process proceeds to step S06. In this step S06, the amount of electricity I to be supplied to the motor 14 is increased by the predetermined amount (ΔI), (i.e., I=I+ΔI), then the process proceeds to step S07.

On the other hand, if the determination result in step S05 is YES (I≧$I_0$), then the process proceeds to step S07 without executing the process of step S06.

That is, when the current winding position x of the belt reel 11 is located between the winding position at the releasing X0 and the first winding position X1, the amount of electricity to be supplied to the motor 14 is set to substantially constant value that is not lower than the initial current value $I_0$. This is because when the winding amount by the belt reel 11 from the winding position at the releasing X0 is less than the predetermined amount a, there are cases in which: the occupant P still does not release the tongue 8 from his/her hand; or the tongue 8 or the seatbelt 5 is easily hooked on the occupant P even though the occupant P has released the tongue 8 from his/her hand. In this duration, the torque by the motor 14 is set so as not to be increased much more, by setting the amount of the electricity to be supplied to the motor 14 be substantially equal to the initial current value $I_0$. With this, when the occupant P holds the tongue 8 or the seatbelt 5 is hooked on the occupant P, it is possible to prevent excessive tension applied to the seatbelt 5, and thereby preventing causing uncomfortableness to the occupant P.

Moreover, the reason why the first winding position X1 is set to the position where the predetermined amount a is wound from the winding position at the releasing X0, is that the winding position at the releasing X0 changes depending on the physique of the occupant P.

Also when the determination result in step S04 is NO (x≧X1), then the process proceeds to step S07.

In step S07, it is determined whether the current winding position x by the belt reel 11 reaches the first winding position X1 or not.

If the determination result in step S07 is YES (x=X1), then the process proceeds to step S08. In this step S08, a winding speed $V_{X1}$ of the belt reel 11 when the winding position x of the belt reel 11 reaches the first winding position X1, is set to a target winding speed Vtarget (Vtarget=$V_{X1}$), then the process proceeds to step S09. The winding speed of the belt reel 11 is calculated based on the amount of change in the winding position of the belt reel 11, which is measured by the rotational position sensor 15.

In addition, also when the determination result in step S07 is NO (x≠X1), the process proceeds to step S09.

In step S09, it is determined whether the current winding position x is larger than the first winding position X1 and is equal to or less than a second winding position X2, or not. Moreover, the second winding position X2 is set to a position where is more predetermined distance to reach a winding position X3 where the seatbelt 5 is completely housed (hereinafter "a complete winding position"). Therefore, the second winding position X2 is set to the position where the occupant P wearing the seatbelt apparatus 1 can easily remove his/her hand from the seatbelt 5. The second winding position X2 also can be said as a winding position where is reachable by further winding a second predetermined amount b from the first winding position X1. Moreover, in the present embodiment, the second winding position X2 is fixed, and the second predetermined amount b changes in accordance with the winding position at the releasing X0 which changes in accordance with the physique of the occupant P; however, it may be arranged such that the second predetermined amount b is fixed while the second winding position X2 is changeable.

If the determination result in step S09 is YES (X1<x≦X2), then the process proceeds to step S10. In this step S10, it is determined whether the current winding speed V of the belt reel 11 reaches the target winding speed Vtarget set in step S08, or not.

If the determination result in step S10 is YES (V≠Vtarget), then the process proceeds to step S11. In this step S11, it is determined whether the current winding speed V of the belt reel 11 is larger than the target winding speed Vtarget or not.

If the determination result in step S11 is NO (V≦Vtarget), then the process proceeds to step S12. In this step S12, the amount of electricity I to be supplied to the motor 14 is increased by the predetermined amount (ΔI), (i.e., I=I+ΔI), then the process proceeds to step S14.

If the determination result in step S11 is YES (V>Vtarget), then the process proceeds to step S13. In this step S13, the amount of electricity I to be supplied to the motor 14 is decreased by the predetermined amount (ΔI), (i.e., I=I−ΔI), then the process proceeds to step S14.

If the determination result in step S10 is NO (V=Vtarget), then the process proceeds to step S14 without executing steps S11 to S13.

That is, when the current winding position x of the belt reel 11 is within a range where is larger than the first winding position X1 and is equal to or less than the second winding position X2, the amount of electricity to be supplied to the motor 14 is controlled such that the winding speed V of the belt reel 11 becomes the constant target winding speed Vtarget (=$V_{X1}$). With this operation, the seatbelt 5 can be wound stably and smoothly.

Also when the determination result in step S09 is NO (x≦X1, or x>X2), then the process proceeds to step S14.

In this step S14, it is determined whether the current winding position x of the belt reel 11 is larger than the second winding position X2 and is smaller than the complete winding position X3, or not.

If the determination result in step S14 is YES (X2<x≦X3), then the process proceeds to step S15. In this step S15, the amount of electricity I to be supplied to the motor 14 is set to the current value calculated by the following equation, and the process proceeds to step S16.

$$I = I_{X2} - C(x - X2)$$

where $I_{X2}$ is a current value to be supplied to the motor 14 when the winding position x of the belt reel 11 reaches the second winding position X2, while C is a coefficient (constant value).

That is, after the current winding position x of the belt reel 11 exceeds the second winding position X2, the current I to be supplied to the motor 14 is controlled so as to be gradually reduced as the winding amount increases, with reference to the current value $I_{X2}$ of the motor 14 at the time reaching to the second winding position X2. With this operation, the winding speed of the belt reel 11 can be continuously and gradually decreased as approaching to the end of the winding of the belt reel 11. As the result, it is possible to prevent the tongue 8 roughly contacting an interior decoration of the vehicle when the seatbelt 5 is almost completely wound.

If the determination result in step S14 is NO (x≦X2, or x>X3), then the process proceeds to step S16.

In this step S16, it is determined whether the current winding position x of the belt reel 11 reaches the complete winding position X3 or not.

If the determination result in step S16 is NO (x≠X3), then the process returns to step S04, and the processes from step S04 to step S16 are repeated.

If the determination result in step S16 is YES (x=X3), then the process proceeds to step S17. In this step S17, the electricity to the motor 14 is stopped, and the process of the present routine is temporarily ended.

Figure 5:
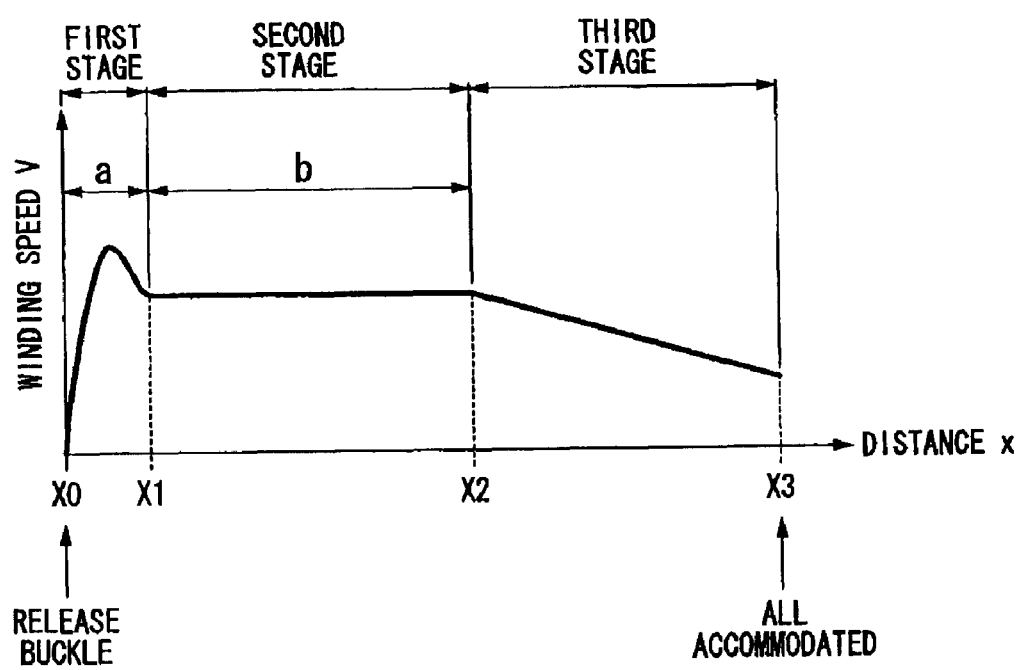
FIG. 5 is a graph showing the characteristics of the seatbelt apparatus for winding the belt reel.

The winding characteristic when the amount of electricity to the motor 14 is controlled as explained in the above is shown in FIG. 5. In FIG. 5, the horizontal axis indicates the winding position x of the belt reel 11, while the vertical axis indicates the winding speed V of the belt reel 11.

Figure 6A:
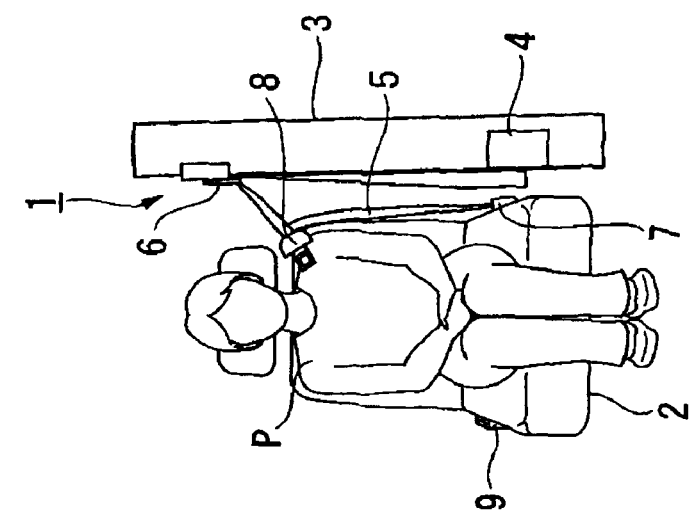
FIGS. 6A to 6C are front views of the seatbelt apparatus, indicating the winding states of the seatbelt in time series.

As shown in FIG. 6A, a first stage from the winding position at the releasing X0 to the first winding position X1 corresponds to an initial region of winding of the seatbelt 5. In the first stage, the amount of electricity to be supplied to the motor 14 is controlled to be substantially constant, and the winding speed by the belt reel 11 gradually increases. In the first stage, by controlling the amount of electricity to be supplied to the motor 14 so as to be substantially constant, as explained in the above, it is possible to prevent the excessive tension applied on the seatbelt 5 when the tongue 8 is held by the occupant P or when the tongue 8 or the seatbelt 5 is hooked onto the occupant P. As the result, it is possible to prevent causing uncomfortableness to the occupant P.

Figure 6B:
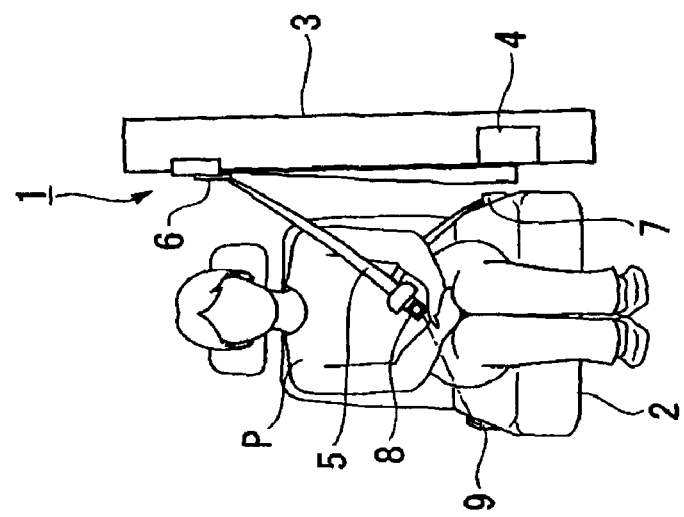

The second stage from the first winding position X1 to the second winding position X2 is, as shown in FIG. 6B, a middle region for winding the seatbelt 5. In this second stage, the winding speed $V_{X1}$ of the belt reel 11 when the winding position x of the belt reel 11 reaches the first winding position X1 is set to the target winding speed Vtarget; and during the second stage, the amount of electricity to be supplied to the motor 14 is controlled such that the winding speed V of the belt reel 11 becomes constant value of the target winding speed Vtarget (=$V_{X1}$).

That is, while shifting from the first stage to the second stage, the initial value for a control target (the target winding speed Vtarget) at the second stage is set based on the winding speed (changing amount in the winding position) of the belt reel 11; and in the second stage, the amount of electricity to be supplied to the motor 14 is controlled such that the winding speed V of the belt reel 11 is maintained to the target winding speed Vtarget (i.e., based on the predetermined rule).

With these operations, in the second stage, the seatbelt 5 is wound stably and smoothly. In addition, while shifting from the first stage to the second stage, the initial value for a control target (the target winding speed Vtarget) in the second stage is set based on the winding speed (the amount of change in the winding position) $V_{X1}$ of the belt reel 11 in the first winding position X1. Accordingly, the continuity while shifting from the first stage to the second stage is maintained, and thereby preventing causing uncomfortableness to the occupant P.

Figure 6C:
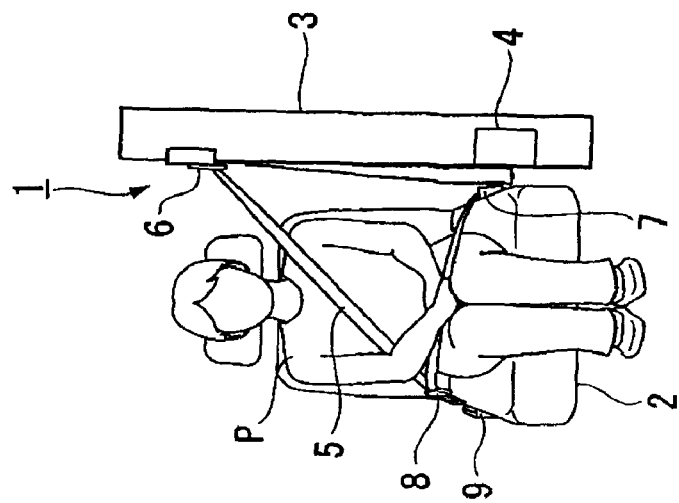

As shown in FIG. 6C, the third stage from the second winding position X2 to the complete winding position X3 is a final region for winding the seatbelt 5. In this third stage, the current I to be supplied to the motor 14 is controlled so as to be gradually decreased as the amount of winding increases, based on the current value $I_{X2}$ of the motor 14 at the time when the current I to be supplied to the motor 14 reaches the second winding position X2.

With these operations, in the third stage, it is possible to continuously and gradually decrease the winding speed of the belt reel 11 as approaching to the end of winding of the belt reel 11, from the winding speed at the second winding position X2 (i.e., the winding speed $V_{X1}$ at the first winding position X1). As the result, it is possible to prevent the tongue 8 roughly contacting an interior decoration of the vehicle when the seatbelt 5 is almost completely wound.

Moreover, it may be provided with a control-stopping interval for suddenly reducing the amount of electricity to be supplied to the motor 14 (for example, reducing the current value to zero) while shifting from the second stage to the third stage. In this case, during this control-stopping interval, the occupant P can remove his/her hand from the seatbelt 5 easily.

In the present embodiment, the first stage corresponds to the first control mode, while the second stage and the third stage correspond to the second control mode.

Second Embodiment

Next, a seatbelt apparatus according to a second embodiment of the present invention will be explained below with reference to FIG. 7.

The seatbelt apparatus 1 of the present embodiment has the same construction as that of the first embodiment; therefore, explanation therefor will be omitted here. The present embodiment differs from the first embodiment in a current control of the motor 14 while winding the belt reel after releasing the buckle 9.

Figure 7:
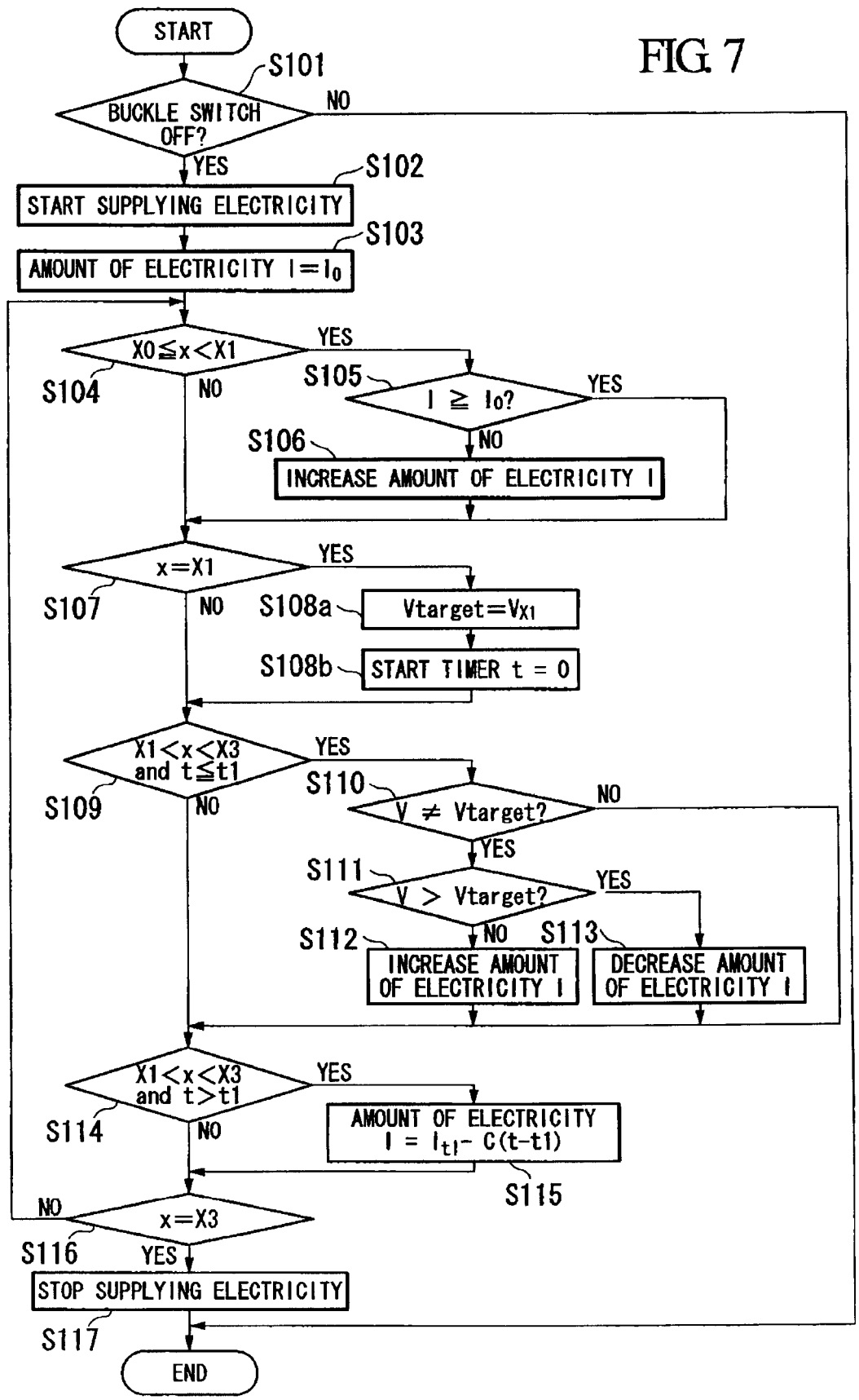
FIG. 7 is a flowchart for controlling current to be supplied to a motor for driving a belt reel in a seatbelt apparatus according to a second embodiment of the present invention.

FIG. 7 is a flowchart showing the current control of the motor 14 of the present embodiment. In the first embodiment, the stop timing of the second stage is set to the time when the winding position x of the belt reel 11 reaches the second winding position X2; however, in the present embodiment, the stop timing of the second stage is set to the time when the predetermined time has passed after reaching to the first winding position X1.

The processes of the present embodiment will be explained below with reference to the flowchart of FIG. 7.

The processes in steps S101 to S107 are same as those of steps S01 to S07 in the first embodiment; therefore, the explanations therefor will be omitted here.

If the determination result in step S107 is YES (x=X1), then the process proceeds to step S108a. In this step S108a, the winding speed $V_{X1}$ of the belt reel 11 at the time when the winding position x of the belt reel 11 reaches the first winding position X1 is set to the target winding speed Vtarget (Vtarget=$V_{X1}$) of the belt reel 11, and then the process proceeds to step S108b.

In this step S108b, timer for counting elapsed time t after reaching to the first winding position X1 is reset (t=0), and is started to count the elapsed time. Then, the process proceeds to step S109.

Also in the case in which the determination result in step S107 is NO (x≠X1), then the process proceeds to step S109.

In this step S109, it is determined: whether the current winding position x of the belt reel 11 is smaller than the complete winding position X3 and is larger than the first winding position X1; and the elapsed time is equal to or less than the predetermined time t1 which was set in advance.

If the determination result in step S109 is YES (X1<x<X3, and t≦t1), then the process proceeds to step S110. On the other hand, if the determination result in step S109 is NO (x≦X1, or x≧X3, or t>t1), then the process proceeds to step S114.

The processes of steps S110 to S113 are the same as those of steps S10 to S13 of the first embodiment; therefore, explanations therefor will be omitted here. By executing the processes of steps S110 to S113, in a duration from the time reaching to the first winding position X1 to the time the predetermined time t1 has passed, it is possible to control the amount of electricity to be supplied to the motor 14 such that the winding speed V of the belt reel 11 is maintained at the target winding speed Vtarget (=$V_{X1}$). As the result, the seatbelt 5 can be wound stably and smoothly. After executing the processes of steps S112 and S113, the process proceeds to step S114.

In this step S114, it is determined whether (i) the current winding position x of the belt reel 11 is larger than the first winding position X1 and is smaller than the complete winding position X3, and (ii) the elapsed time has exceeded the predetermined time t1.

If the determination result in step S114 is YES (X1<x<X3, and t>t1), then the process proceeds to step S115. In this step S115, the amount of electricity I to be supplied to the motor 14 is set to the current value calculated by the following equation, and the process proceeds to step S116.

$$I = I_{t1} - C(t-t1)$$

where: $I_{t1}$ is a current value of the motor 14 at the time when the predetermined time t1 has elapsed after the winding position x of the belt reel 11 reaches to the first winding position X1; and C is a coefficient (constant value).

That is, after the predetermined time t1 has passed, the current I to be supplied to the motor 14 is controlled so as to be gradually reduced as time passes, with reference to the current $I_{t1}$ of the motor 14 at the time when the predetermined time t1 has passed. With this operation, the winding speed of the belt reel 11 can be continuously and gradually reduced as approaching to the end of winding of the belt reel 11. As the result it is possible to prevent the tongue 8 roughly contacting an interior decoration of the vehicle when the seatbelt 5 is almost completely wound.

If the determination result in step S114 is NO (x≦X1, or x≧X3, or t≦t1), then the process proceeds to step S116.

The processes in steps S116 and S117 are the same as those of steps S16 and S17 of the first embodiment; therefore, explanation therefor will be omitted here.

The seatbelt apparatus 1 of the present embodiment can also obtain the same operations and advantageous effects as those of the first embodiment.

Moreover, in the present embodiment, as same as the first embodiment, the first stage corresponds to the first control mode, while the second stage and the third stage correspond to the second control mode.

Third Embodiment

Next, a seatbelt apparatus according to a third embodiment of the present invention will be explained below with reference to FIGS. 8 and 9.

The seatbelt apparatus 1 of the present embodiment has the same construction as that of the first embodiment; therefore, explanation therefor will be omitted here. The present embodiment differs from the first embodiment in a current control of the motor 14 while winding the belt reel after releasing the buckle 9.

Figure 8:
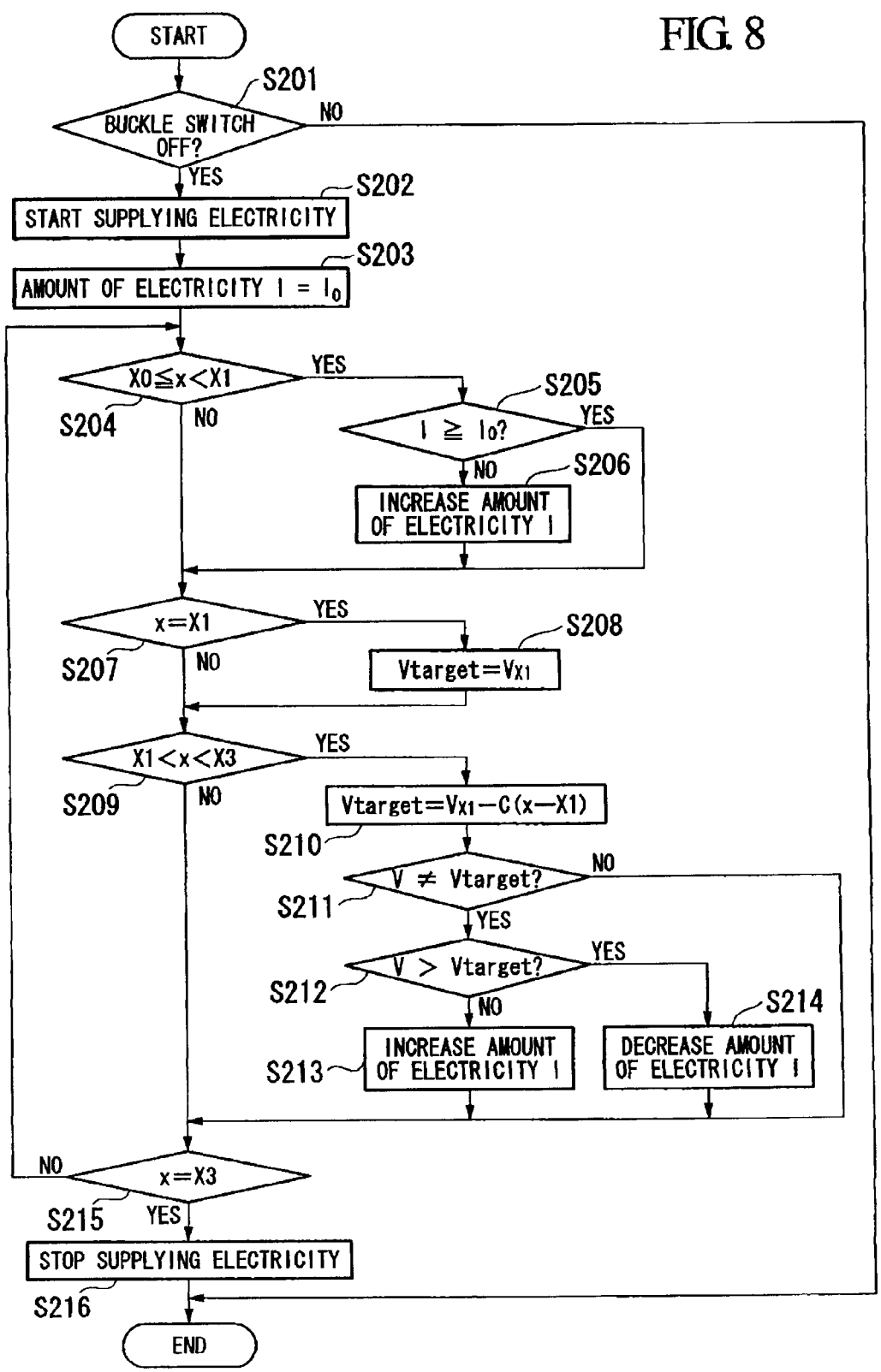
FIG. 8 is a flowchart for controlling current to be supplied to a motor for driving a belt reel in a seatbelt apparatus according to a third embodiment of the present invention.
Figure 9:
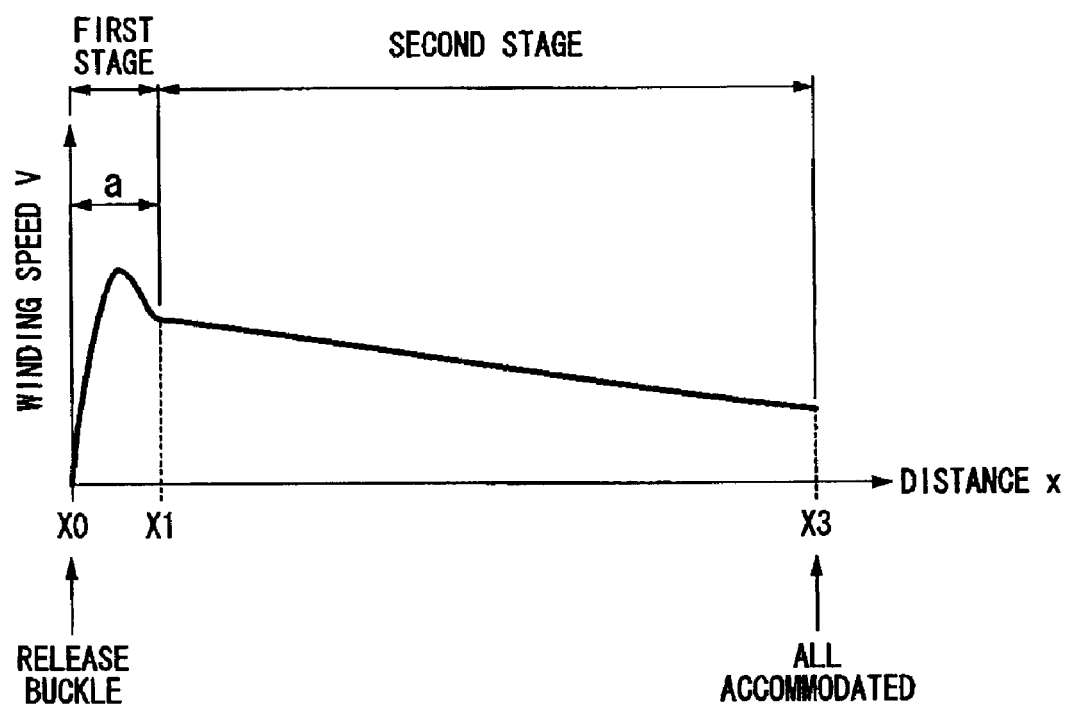
FIG. 9 is a graph showing the characteristics of the seatbelt apparatus for winding the belt reel.

FIG. 8 is a flowchart showing a current control of the motor 14 of the present embodiment. In the first embodiment, (i) the second stage for controlling the winding speed of the belt reel 11 to be the constant, and (ii) the third stage for gradually reducing the winding speed V of the belt reel 11 by gradually reducing the amount of electricity, are executed after the winding position x of the belt reel 11 has reached to the first winding position X1 (i.e., after the first stage). In the present embodiment, as shown in a graph of FIG. 9 indicating the characteristics of the seatbelt apparatus for winding the belt reel 11, a stage for controlling the winding speed of the belt reel 11 to be constant (i.e., the second stage in the first embodiment) is not provided after the first stage, and there-instead, a stage for gradually reducing the winding speed V of the belt reel 11 (i.e., the second stage in the present embodiment) is provided after the first stage.

The processes of the present embodiment will be explained below with reference to the flowchart of FIG. 8.

The processes in steps S201 to S208 are the same as those of steps S01 to S08 in the first embodiment; therefore, the explanations therefor will be omitted here.

When the determination result in step S207 is NO (x≠X1), or when the process of step S208 has been executed, the process proceeds to step S209.

In step S209, it is determined whether the current winding position x of the belt reel 11 is larger than the first winding position X1 and is smaller than the complete winding position X3, or not.

If the determination result in step S209 is YES (X1<x<X3), then the process proceeds to step S210. In this step S210, the target winding speed Vtarget of the belt reel 11 is set to the winding speed calculated by the following equation.

$$V\text{target} = V_{X1} - C(x - X1)$$

where $V_{X1}$ is the winding speed of the belt reel 11 at the time when the winding position x of the belt reel 11 reaches the first winding position X1, while C is a coefficient (constant value).

That is, after the current winding position x of the belt reel 11 exceeds the first winding position X1, the winding speed V of the belt reel 11 is set so as to gradually decreases as the amount of winding increases, with reference to the winding speed $V_{X1}$ at the time of reaching to the first winding position X1.

The process proceeds from step S210 to S211, and it is determined whether the current winding speed V of the belt reel 11 matches with the target winding speed Vtarget that was set in step S210.

If the determination result in step S211 is YES (V≠Vtarget), then the process proceeds to step S212. In this step S212, it is determined whether the current winding speed V of the belt reel 11 is larger than the target winding speed Vtarget or not.

If the determination result in step S212 is NO (V≦Vtarget), then the process proceeds to step S213. In this step S213, the amount of electricity I to be supplied to the motor 14 is increased by the predetermined amount (ΔI), (i.e., I=I+ΔI), and the process proceeds to step S215.

If the determination result in step S212 is YES (V>Vtarget), then the process proceeds to step S214. In this step S214, the amount of electricity I to be supplied to the motor 14 is decreased by the predetermined amount (ΔI), (i.e., I=I−ΔI), and the process proceeds to step S215.

If the determination result in step S211 is NO (V=Vtarget), then the process proceeds to step S215 without executing the processes of steps S212 to S214.

That is, when the current winding position x of the belt reel 11 is within a range that is over the first winding position X1 and is less than the complete winding position X3, the amount of electricity to be supplied to the motor 14 is controlled such that the winding speed V of the belt reel 11 gradually decreases as approaching to the end of winding of the belt reel 11.

If the determination result in step S209 is NO (x≦X1, or x≧X3), then the process proceeds to step S215.

The processes in steps S215 and S216 are same as those of steps S16 and S17 of the first embodiment; therefore, the explanations therefor will be omitted here.

Also in the present embodiment, the amount of electricity to be supplied to the motor 14 is controlled so as to be substantially constant in the first stage from the winding position at the releasing X0 to the first winding position X1. Accordingly, it is possible to prevent the excessive tension applied onto the seatbelt 5 when the tongue 8 is held by the occupant P or when the tongue 8 or the seatbelt 5 is hooked on the occupant P. As the result, it is possible to prevent causing uncomfortableness to the occupant P.

In addition, also in the present embodiment, while shifting from the first stage to the second stage, the initial value for a control target (the target winding speed Vtarget) in the second stage is set based on the winding speed (the amount of change in the winding position) $V_{X1}$ of the belt reel 11 in the first winding position X1. Accordingly, the continuity while shifting from the first stage to the second stage is maintained, and thereby preventing causing uncomfortableness to the occupant P.

Furthermore, in the present embodiment, in the second stage from the first winding position X1 to the complete winding position X3, the current I to be supplied to the motor 14 is controlled such that the winding speed of the belt reel 11 continuously and gradually decreases as approaching to the end of winding of the belt reel 11, from the winding speed $V_{X1}$ at the time of reaching to the first winding position X1 (that is, based on the predetermined rule). With this operation, it is possible to stably and smoothly wind the seatbelt 5, and thereby enabling preventing the tongue 8 roughly contacting with an interior decoration of the vehicle when the seatbelt 5 is almost completely wound.

Moreover, in the present embodiment, the first stage corresponds to the first control mode, while the second stage corresponds to the second control mode.

Fourth Embodiment

Next, a seatbelt apparatus according to a fourth embodiment of the present invention will be explained below with reference to FIGS. 10 and 11.

The seatbelt apparatus 1 of the present embodiment has the same construction as that of the first embodiment; therefore, explanation therefor will be omitted here. In the above-mentioned first to third embodiments, the motor 14 is activated to wind the belt reel 11 while releasing the buckle 9. In the present embodiment, after the tongue 8 is engaged with the buckle 9, the motor 14 is activated to: remove the looseness in the seatbelt 5, that arises while traveling the vehicle; or to remove the looseness in the seatbelt 5 by applying the predetermined tension to the seatbelt 5 when the predetermined traveling state is detected by the traveling state detection device 18.

A current control of the motor 14 in the present embodiment will be explained below with reference to the flowchart of FIG. 10.

Figure 10:
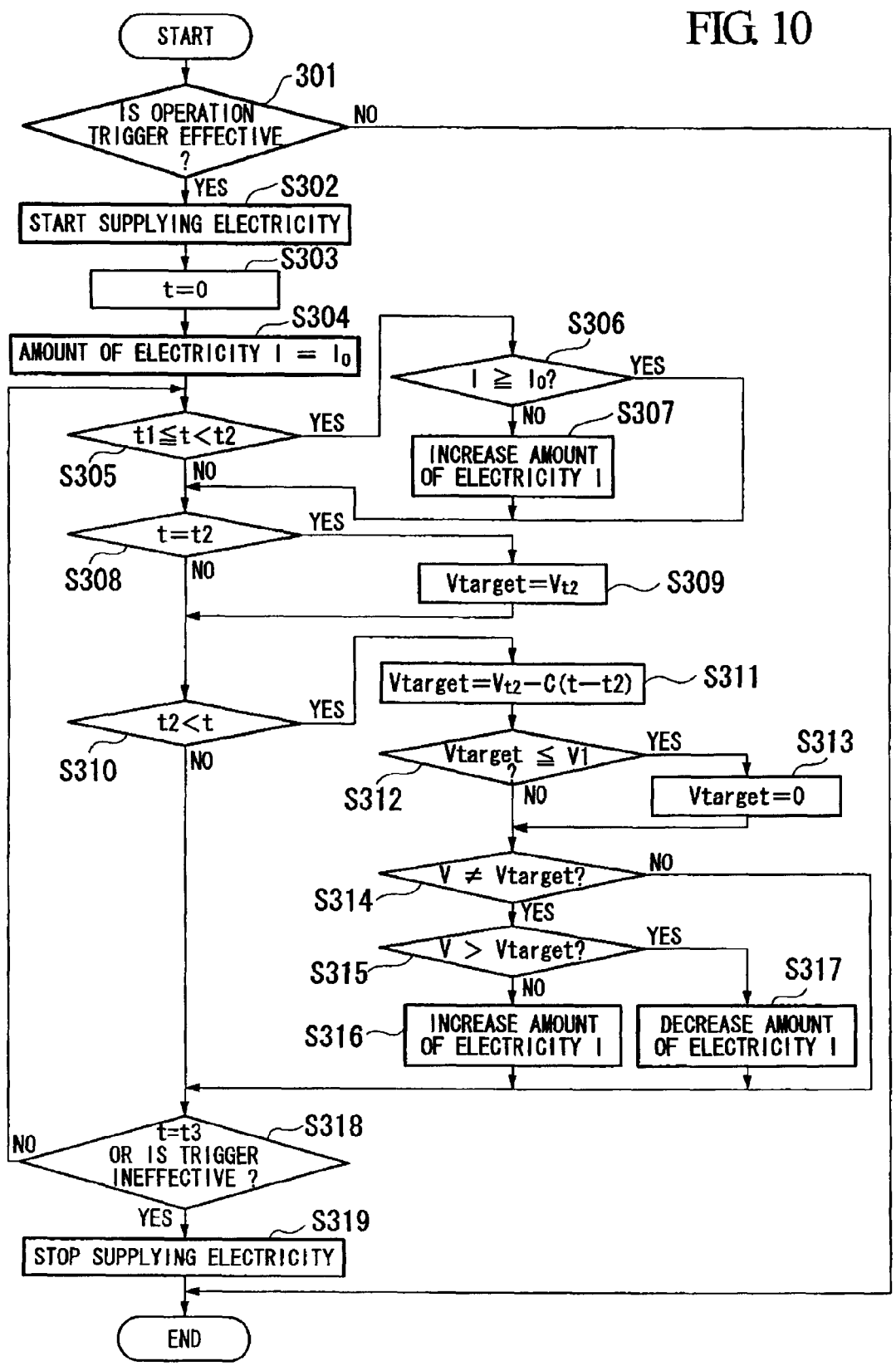
FIG. 10 is a flowchart for controlling current to be supplied to a motor for driving a belt reel in a seatbelt apparatus according to a fourth embodiment of the present invention.

A current control routine of the motor 14 shown in the flowchart of FIG. 10 is repeated at each predetermined timings by the motor controller 20.

In step S301, it is determined whether an operation trigger is effective or not. The operation trigger is determined to be effective when the looseness in the seatbelt 5 while traveling is detected or when the predetermined traveling state is detected by the traveling state detection device 18.

If the determination result in step S301 is NO (ineffective), then the execution of the present routine is temporarily ended.

If the determination result in step S301 is YES (effective), then the process proceeds to step S302. In this step S302, the supply of the electricity to the motor 14 is started, and then the process proceeds to step S303. In this step S303, the timer is reset (t=0), counting the time is started, and then the process proceeds to step S304. In this step S304, the amount of electricity (current) I to be supplied to the motor 14 is set to the initial current value $I_0$ that is set in advance.

Subsequently, the process proceeds to step S305, and it is determined whether the elapsed time after staring counting timer is equal to or larger than the first predetermined time t1 and less than the second predetermined time t2.

If the determination result in step S305 is YES (t1≦t<t2), then the process proceeds to step S306. In this step S306, it is determined whether the current I to be supplied to the motor 14 that is measured by the current sensor 16 is equal to or larger than the initial current value $I_0$.

If the determination result in step S306 is NO (I<$I_0$), then the process proceeds to step S307. In this step S307, the amount of electricity I to be supplied to the motor 14 is increased by the predetermined amount (ΔI), (i.e., I=I+ΔI), then the process proceeds to step S308.

On the other hand, if the determination result in step S306 is YES (I≧$I_0$), then the process proceeds to step S308 without executing the process of step S307.

That is, when the elapsed time is equal to or larger than the first predetermined time t1 and is smaller than the second predetermined time t2, the amount of electricity to be supplied to the motor 14 is set to be the constant value which is not lower than the initial current value $I_0$. With this operation, the torque of the motor 14 can be controlled so as not to be increased much more. Accordingly, it is possible to prevent the excessive tension applied onto the seatbelt 5 when the tongue 8 is held by the occupant P or when the tongue 8 or the seatbelt 5 is hooked onto the occupant P. As the result, it is possible to prevent causing uncomfortableness to the occupant P.

Also in the case in which the determination result in step S305 is NO (t<t1, or t≧t2), the process proceeds to step S308.

In this step S308, it is determined whether the elapsed time has reached the second predetermined time t2 or not.

If the determination result in step S308 is YES (t=t2), then the process proceeds to step S309. In this step S309, the winding speed $V_{t2}$ of the belt reel 11 at the time when the elapsed time has reached to the second predetermined time t2, is set to the target winding speed Vtarget of the belt reel 11 (i.e., Vtarget=$V_{t2}$); and then the process proceeds to step S310. Moreover, the winding speed of the belt reel 11 is calculated based on the amount of change in the winding position of the belt reel 11 that is measured by the rotational position sensor 15.

Also in the case in which the determination result in step S308 is NO (t≠t2), then the process proceeds to step S310.

In step S310, it is determined whether the elapsed time has exceeded the second predetermined time t2 or not.

If the determination result in step S310 is YES (t>t2), then the process proceeds to step S311. In this step S311, the target winding speed Vtarget of the belt reel 11 is set o the winding speed that is calculated by the following equation.

$$Vtarget = V_{t2} - C(t - t2)$$

where C is a coefficient (constant value).

That is, after the elapsed time has exceeded the second predetermined time t2, the winding speed V of the belt reel 11 is set so as to be gradually decreased as time passes, with reference to the winding speed $V_{t2}$ at the second predetermined time t2.

Subsequently, the process proceeds from step S311 to step S312, and it is determined whether the target winding speed Vtarget that is set in step S311 is equal to or less than the winding speed V1 that was set in advance. Moreover, the first winding speed V1 is set to the value that is close to but is larger than zero.

If the determination result in step S312 is YES (Vtarget≦V1), then the process proceeds to step S313. In this step S313, the target winding speed Vtarget of the belt reel 11 is set to zero (Vtarget=0), then the process proceeds to step S314.

Also in the case in which the determination result in step S312 is NO (Vtarget>V1), the process proceeds to step S314.

In step S314, it is determined whether the current winding speed V of the belt reel 11 has reached the target winding speed Vtarget or not.

If the determination result in step S314 is YES (V≠Vtarget), then the process proceeds to step S315. In step S315, it is determined whether the current the winding speed V of the belt reel 11 is larger than the target winding speed Vtarget or not.

If the determination result in step S315 is NO (V≦Vtarget), then the process proceeds to step S316. In step S316, the amount of electricity I to be supplied to the motor 14 is increased by the predetermined amount (ΔI), (i.e., I=I+ΔI), then the process proceeds to step S318.

If the determination result in step S315 is YES (V>Vtarget), then the process proceeds to step S317. In step S317, the amount of electricity I to be supplied to the motor 14 is decreased by the predetermined amount (ΔI), (i.e., I=I−ΔI), then the process proceeds to step S318.

If the determination result in step S314 is NO (V=Vtarget), then the process proceeds to step S318 without executing the processes of steps S315 to S317.

That is, when the elapsed time has exceeded the second predetermined time t2, the amount of electricity to be supplied to the motor 14 is controlled such that the winding speed V of the belt reel 11 gradually decreases as approaching to the end of winding of the belt reel 11.

If the determination result in step S310 is NO (t≦t2), then the process proceeds to step S318.

In step S318, it is determined whether one of (i) the elapsed time has reached to the third predetermined time t3, and (ii) the operation trigger is ineffective, is satisfied or not.

If the determination result in step S318 is NO (t≠t3, and the operation trigger is effective), then the process is returned to step S305, and the processes from step S305 to step S318 are repeated.

If the determination result in step S318 is YES (t=t3, or the operation trigger is ineffective), then the process proceeds to step S319. In step S319, the electricity to be supplied to the motor 14 is stopped, and the execution of the present routine is temporarily ended.

Figure 11:
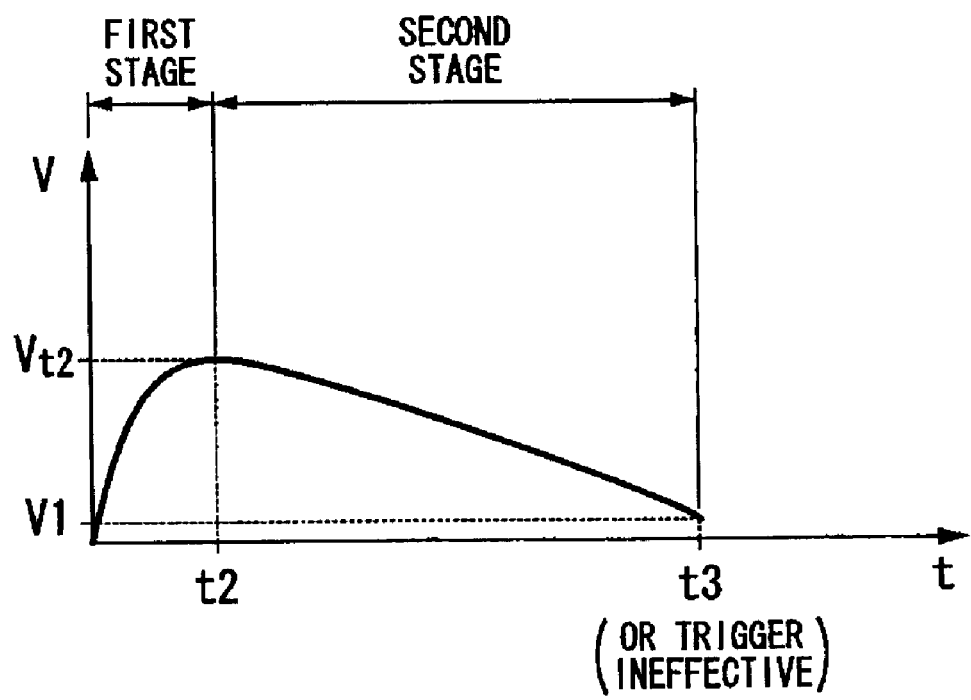
FIG. 11 is a graph showing the characteristics of the seatbelt apparatus for winding the belt reel.

A winding characteristic of the present embodiment is shown in FIG. 11. In the present embodiment, until the elapsed time has reached to the second predetermined time t2 is a first stage where the amount of electricity to be supplied to the motor 14 is controlled to be the substantially constant value. In addition, after the elapsed time has exceeded the second predetermined time t2 is a second stage where the amount of electricity to be supplied to the motor 14 is controlled such that the winding speed of the belt reel 11 gradually decreases.

In the first stage, the amount of electricity to be supplied to the motor 14 is controlled so as to be the substantially constant; therefore, it is possible to prevent the excessive tension applied onto the seatbelt 5 when the tongue 8 is held by the occupant P or when the tongue 8 or the seatbelt 5 is hooked to the occupant P. As the result, it is possible to prevent causing uncomfortableness to the occupant P.

In addition, while shifting from the first stage to the second stage, the initial value for a control target (the target winding speed Vtarget) in the second stage is set based on the winding speed (the amount of change in the winding position) $V_{t2}$. Accordingly, the continuity while shifting from the first stage to the second stage is maintained, and thereby preventing causing uncomfortableness to the occupant P.

In addition, in the second stage, the current I to be supplied to the motor 14 is controlled such that the winding speed of the belt reel 11 continuously and gradually decreases as approaching to the end of removing the looseness in the seatbelt 5, from the winding speed $V_{t2}$ that is the winding speed at the time when the belt reel 11 has reached to the second predetermined time t2 (i.e., based on the predetermined rule). Accordingly, the looseness in the seatbelt 5 can be removed stably and smoothly.

Moreover, in the present embodiment, the first stage is the first control mode, while the second stage is the second control mode.

Other Embodiments

Moreover, the present invention is not limited only to the above-mentioned embodiments.

For example, in the above-mentioned embodiments, in the first control mode, the amount of electricity I is controlled so as to be increased when the actual amount of electricity I to be supplied to the motor 14 is smaller than the initial current value $I_0$ (refer to steps S05, S06, S105, S106, S205, S206, S306, and S307). In addition to this current control, a feedback control may be executed in which the amount of electricity is decreased when the actual amount of electricity I to be supplied to the motor 14 is larger than the initial current value $I_0$, thereby controlling the amount of electricity I to be supplied to the motor 14 becomes constant value of the initial current value $I_0$. Otherwise, the current control to the motor 14 may not be executed after setting the amount of electricity to be supplied to the motor 14, to the initial current value $I_0$ and the supplying of the electricity is started. That is, in the first control mode, the amount of electricity to be supplied to the motor 14 may not be exactly constant, if only it is almost constant.

In the above-mentioned embodiments, the winding speed of the belt reel 11 is gradually decreased, in the second control mode, as approaching to the end of completion of winding or the end of removing the looseness in the seatbelt 5, so as to follow the linear function; however, the present invention is not limited to this. Instead of this, any reduction process may be employed if only the winding speed could be continuously and gradually decreased.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seatbelt apparatus of a vehicle comprising:
a seatbelt;
a belt reel on which the seatbelt is wound;
a motor that rotatably drives the belt reel;
a motor current detector that detects an amount of current being supplied to the motor;
a rotational position sensor that detects a winding position of the belt reel;
a controller that receives detected motor current signals from the motor current detector and belt reel winding position signals from the rotational position sensor and controls a current supplied to the motor in response thereto, said controller also being operable to calculate a winding speed based upon a change in the winding position signal from the rotational position sensor;
wherein during winding of the seatbelt, the seatbelt is wound on the belt reel according to a first control mode until a first predetermined winding position is detected by the rotational position sensor, and then is wound according to a second control mode, and
wherein in the first control mode, the controller monitors the current signals from the current sensor, and if the current supplied to the motor is smaller than a predetermined initial value, then the controller adjusts the current so as to be substantially equal to the predetermined initial value to wind the seatbelt on the belt reel at a variable speed, while if the current supplied to the motor is equal to or greater than the predetermined initial value, then the controller makes no adjustment to the current, and
in the second control mode, the controller sets a target winding speed to be equal to a calculated winding speed based upon winding position signals detected by the rotational position sensor at the first predetermined winding position and adjusts the current supplied to the motor so as to wind the seatbelt on the belt reel at a generally constant speed that is substantially equal to the target winding speed.

2. The seatbelt apparatus according to claim 1, further comprising:
a tongue through which the seatbelt is inserted;
a buckle which detachably engages with the tongue to set the seatbelt in a fitted state; and
a buckle state detection device that detects an engagement/detachment state of the buckle to the tongue, wherein
the controller
performs the first control mode when the buckle state detection device detects a detachment of the tongue to the buckle.

3. The seatbelt apparatus according to claim 2, wherein
the controller performs the second control mode so as to maintain the winding speed at the time when the first predetermined winding position is detected, at an interval from the time when the first predetermined winding position is detected to the time when a second predetermined winding position is detected by the rotational position sensor.

4. The seatbelt apparatus according to claim 1,
wherein the controller
performs the first control mode whereby the winding speed of the belt reel can vary from a time when the seatbelt is detached to when the first predetermined winding position is detected,
performs the second control mode whereby the winding speed of the belt reel remains substantially constant from when the first predetermined winding position is detected to when a second predetermined winding position is detected, and
performs a third control mode whereby the winding speed of the belt reel gradually decreases from when the second predetermined winding position is detected to a time when the seatbelt is completely wound.

5. The seatbelt apparatus of claim 1, wherein the controller decreases the current supplied to the motor as a completion of the winding of the seatbelt approaches, within a duration from when a second predetermined winding position is detected to a time when the seatbelt is completely wound.

6. The seatbelt apparatus of a vehicle according to claim 2, wherein
the controller performs the second control mode so that the seatbelt is wound upon the belt reel at the generally constant speed for a period of time that is equal to or less than a predetermined period of time.

7. The seatbelt apparatus according to claim 3, wherein
the controller performs the second control mode so as to continuously decrease the current supplied to the motor in an interval from the time when the second predetermined winding position is detected to the time when the seatbelt is completely wound.

* * * * *